(12) United States Patent
Kubo

(10) Patent No.: US 6,337,952 B1
(45) Date of Patent: Jan. 8, 2002

(54) LENS APPARATUS

(75) Inventor: Kenichi Kubo, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/556,138

(22) Filed: Apr. 21, 2000

(30) Foreign Application Priority Data

Apr. 26, 1999 (JP) .......................................... 11-118660
Jun. 16, 1999 (JP) .......................................... 11-170057
Jun. 28, 1999 (JP) .......................................... 11-181409

(51) Int. Cl.$^7$ .......................... G03B 17/00; G02B 15/14
(52) U.S. Cl. .............................. 396/76; 396/80; 396/87; 359/696
(58) Field of Search .............................. 396/72, 73, 75, 396/76, 77, 78, 79, 80, 82, 85, 87, 91, 104; 359/696, 697, 698

(56) References Cited

U.S. PATENT DOCUMENTS 5,537,174 A * 7/1996 Ishikawa ..................... 396/76
5,740,476 A * 4/1998 Haraguchi ..................... 396/87
5,890,020 A * 3/1999 Hirasawa ..................... 396/77
5,893,651 A * 4/1999 Sakamoto ..................... 396/85
6,070,016 A * 5/2000 Kaneda ..................... 396/85
6,134,390 A * 10/2000 Kasuya ..................... 396/77

* cited by examiner

Primary Examiner—David M. Gray
Assistant Examiner—Rochelle Blackman
(74) Attorney, Agent, or Firm—Morgan & Finnegan, L.L.P.

(57) ABSTRACT

This invention relates to a TV lens apparatus having the angle of view maintaining function of maintaining the angle of view constant. In the present invention, in a state in which the lens has been operated by the angle of view maintaining function when the zoom lens is endowed with the function of regulating the movement range of the zoom lens to a predetermined range, even if the movement range of the zoom lens is regulated, the zoom lens is driven beyond the regulated range to thereby take matching between the angle of view maintaining function and the lens movement range regulating function.

22 Claims, 12 Drawing Sheets

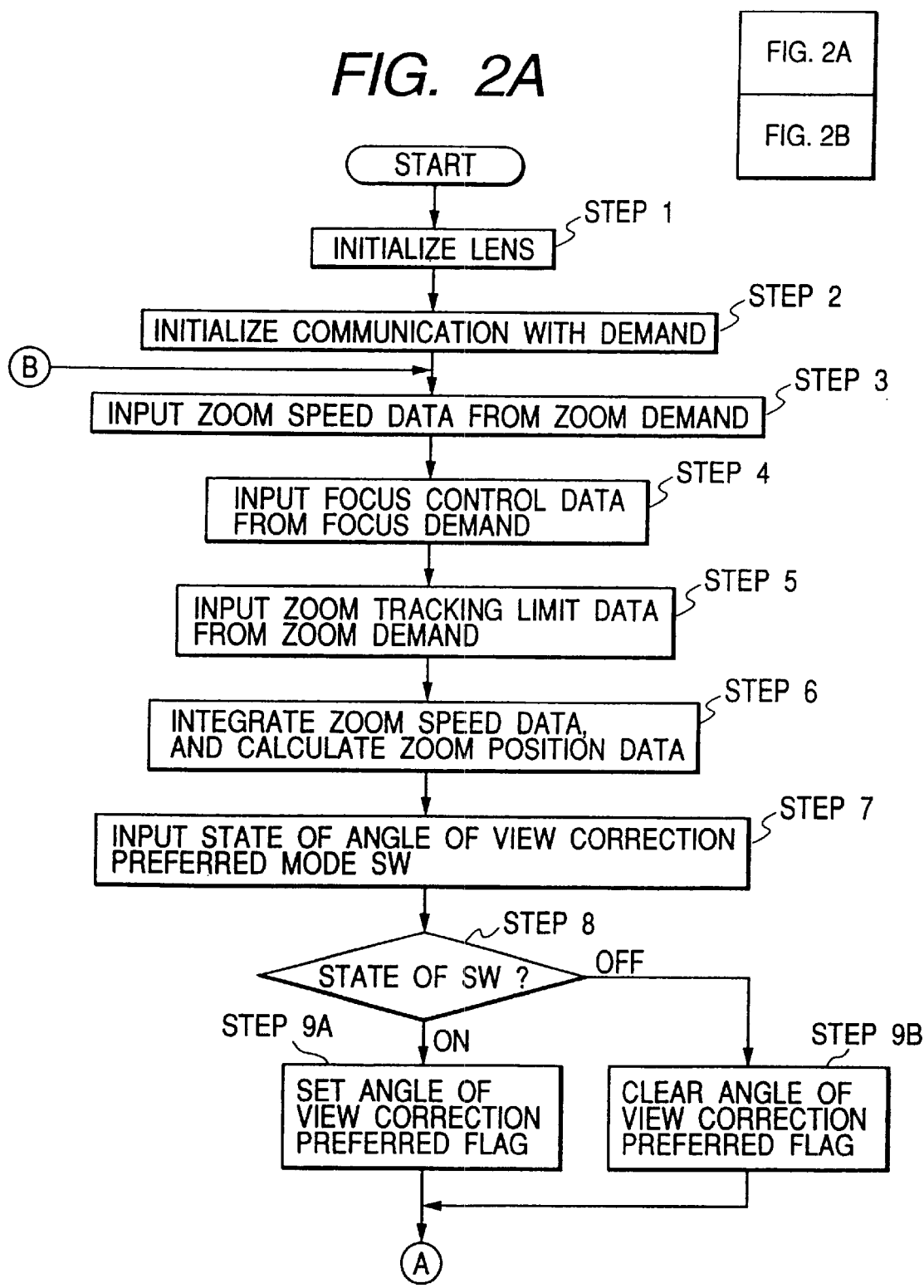

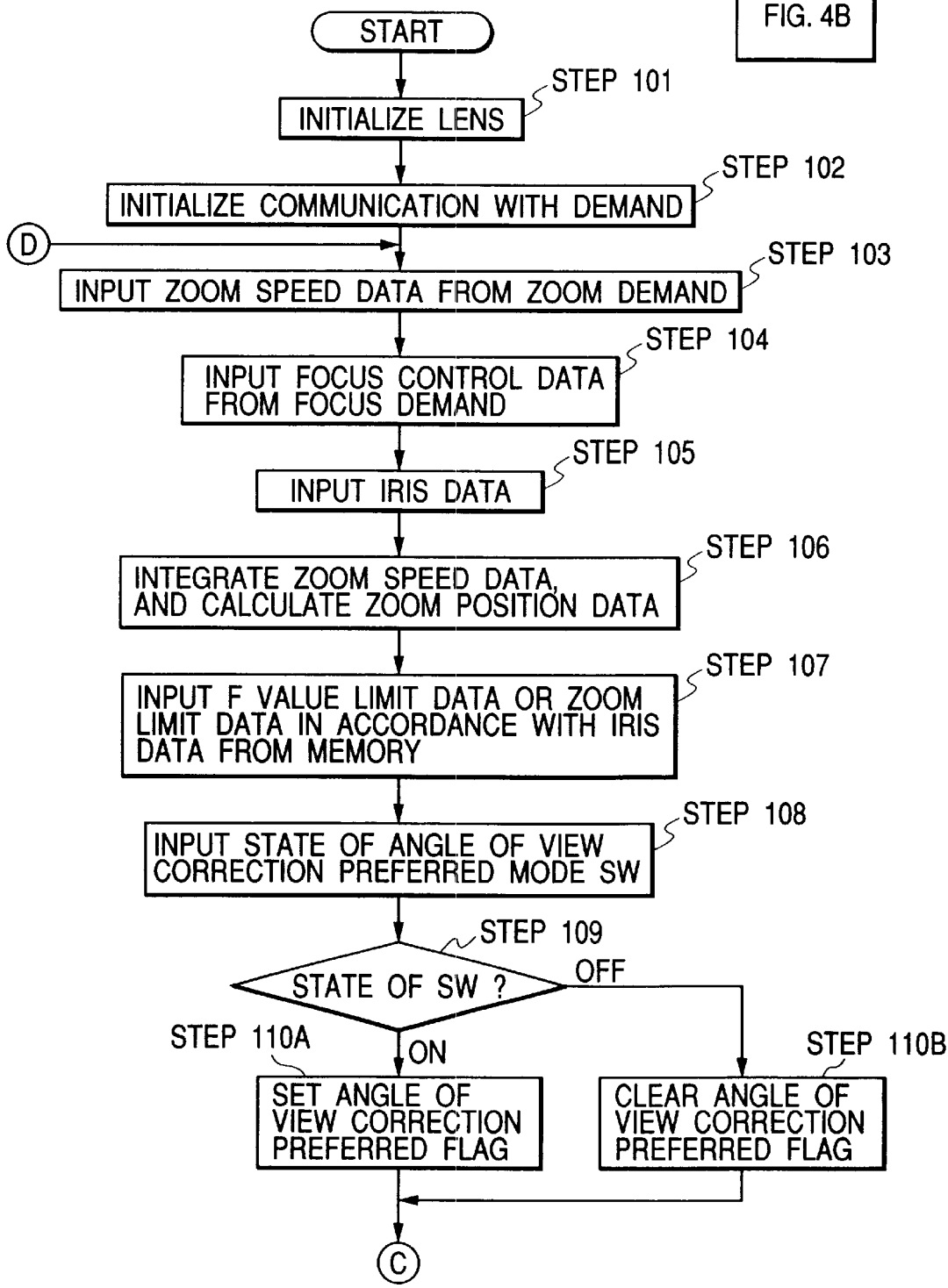

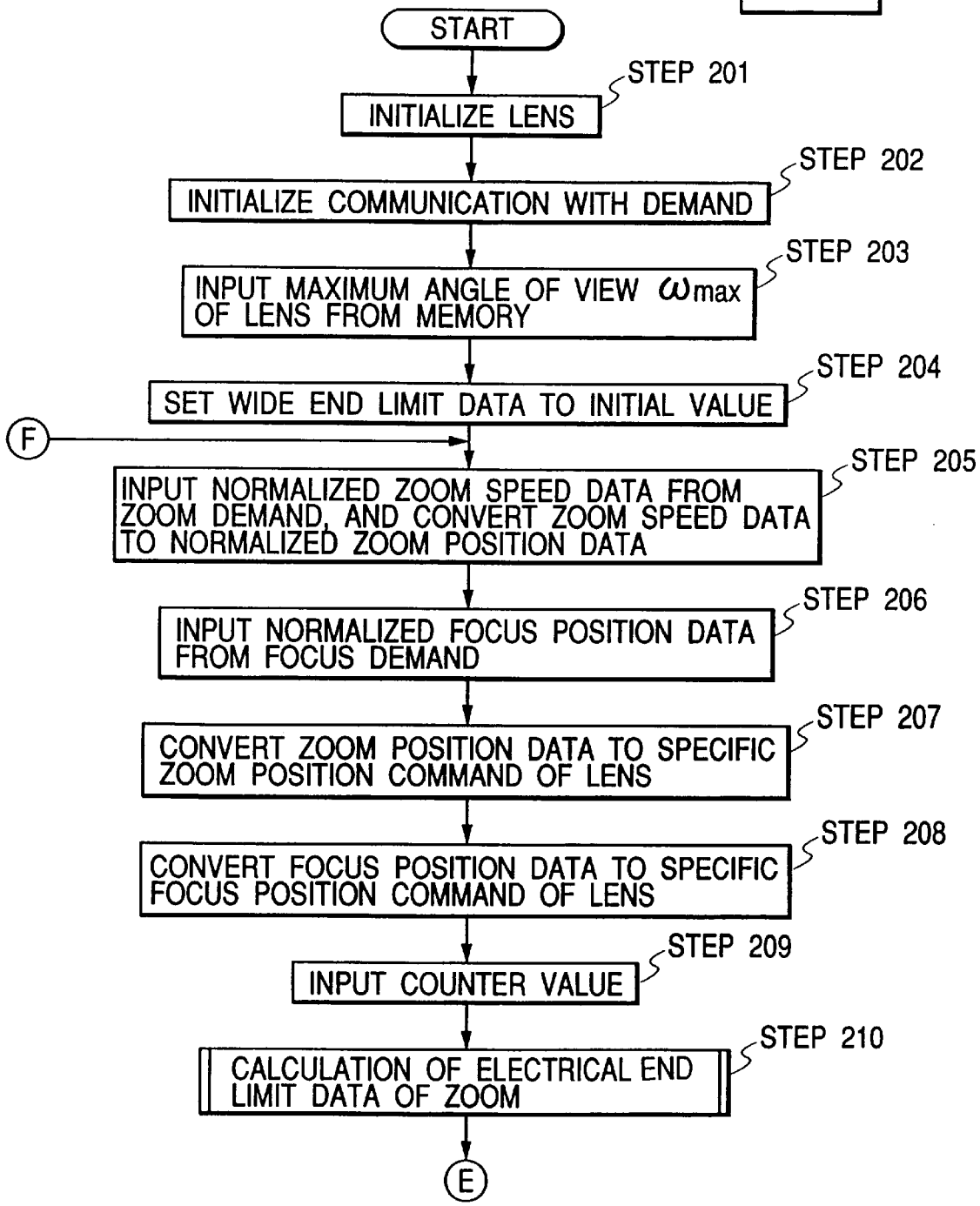

LENS APPARATUS

BACKGROUND OF THE INVENTION

1. Field of the Invention

This invention relates to a zoom lens for use in a TV camera or the like.

2. Related Background Art

The zoom portion of a zoom lens can be controlled to move the lens position to thereby increase or decrease the photographing angle of view, but when the focus position of the zoom lens is controlled, the lens position is likewise moved, whereby the angle of view is varied. That is, even if a desired angle of view is set by the zoom portion, the set angle of view is fluctuated by the control of the focus portion. Therefore, there has been proposed a zoom lens having the so-called angle of view fluctuation correcting function of controlling the zoom portion so that any fluctuation in the angle of view may not occur when the focus portion is controlled.

FIG. 10 of the accompanying drawings shows a flow chart of the zooming operation including the angle of view correcting operation in a zoom lens of a type which controls the position of the lens. In this zoom lens, data are inputted from zoom demand and focus demand (steps 53 and 54), and when there is the input of data from focus demand, a zoom command position for angle of view fluctuation correction is calculated (steps 58 and 61). On the basis of the result of this calculation, a motor for driving the zoom portion is driven (step 62).

Now, some of zoom lenses have the function of limiting the driving range of the zoom portion (the so-called tracking function). In the zoom lens of which the wider angle of view and higher magnification are progressing year by year, when the zoom portion is set to the wide-side, even a person or persons or the like around an object to be photographed who are not wanted to be photographed may come into the image field, and on the other hand, when the zoom portion is set to the tele-end, the object to be photographed may be too much enlarged to be contained in the image field. In such a situation, the operator of the lens needs always to delicately adjust the zoom stop positions on the wide-side and the tele-side by zoom demand.

So, the tracking function for making it possible to limit the driving range of the zoom position, photographing only and object to be photographed at the wide-end and photographing such an image that the whole image of the object is surely contained in the image field at the tele-end without effecting the delicate adjustment by zoom demand becomes useful.

Also, some of zoom lens apparatuses have, in addition to the above-described tracking function, the function of limiting the driving range of the zoom portion (the so-called F value preferred function) in order to avoid the so-called F drop phenomenon that the brightness of the image field is reduced by the driving of the zoom portion. Although in the zoom lens apparatus, a wider angle of view and a higher magnification are progressing year by year, the size of a lens disposed in the front portion of the zoom lens device is limited because of the size and weight of the lens.

Therefore, brightness equal to that on the wide-side cannot be kept in the entire zoom area and there occurs the F drop phenomenon that when the zoom portion is driven from a certain position to the tele-side, the brightness of the image field becomes dark in spite of the set value of a quantity of light setting device (aperture) being constant.

The F value preferred function is the function of calculating a zoom position at which the F drop phenomenon occurs from the value of the aperture in such a case, limiting the driving range of the tele-side at the calculated zoom position and thereby preventing the occurrence of the F drop phenomenon within the driving range of zoom.

Also, in a large lens used in a TV camera, usually with a view to protect a driving portion, the range of a zoom portion and a focus portion which is narrower than a driving end in mechanism is used as an ordinary driving area. Accordingly, when a zoom position command exceeds a position corresponding to wide-end limit data and tele-end limit data set to avoid being driven to the above-mentioned driving end in mechanism, the zoom position command is limited at a wide-end limit position or a tele-end limit position.

SUMMARY OF THE INVENTION

One aspect of the application is to provide a lens apparatus which can perform a proper operation when the lens apparatus having the angle of view correcting function is endowed with the tracking function or the zoom range regulating function such as the F value preferred function.

One aspect of the application is to provide a lens apparatus which can perform the angle of view correcting function as far as possible.

One aspect of the application is to achieve the above object by providing, as a zoom lens apparatus which is provided with a focusing optical portion and a zoom optical portion and in which the range of movement of the zoom optical portion is regulated to a predetermined range, a control circuit having a first mode for setting the movement of the zoom optical portion within the aforementioned regulated range and a second mode for permitting the focusing optical portion to drive a zoom portion beyond the aforementioned regulated range when the fluctuation in angle of view by movement of the focusing optical portion is corrected with the zoom portion movement.

One aspect of the application is to achieve the above objects by providing, in a zoom lens apparatus provided with a focusing optical portion, a zoom optical portion and quantity of light varying means for variably setting the quantity of light passing through the optical portions, a regulating circuit for regulating the range of movement of the zoom portion so that a variation in the quantity of passing light by the movement of the zoom optical portion may not decrease below the set quantity of light, and a control circuit having a first mode for driving the zoom optical portion within the range of movement regulated by the regulating circuit and a second mode for permitting the focusing optical portion to drive the zoom optical portion beyond the range of movement regulated by the regulating circuit when the fluctuation in angle of view by movement of the focusing optical portion is corrected with the zoom portion movement.

One aspect of the application is to achieve the above objects by providing, in a zoom lens apparatus which is provided with a focusing optical portion and a zoom optical portion and in which the movement of the zoom optical portion is regulated to a second movement end inside a first movement end in an area in which the zoom optical portion is movable, a control circuit for permitting the focusing optical portion to drive the zoom optical portion toward the first movement end beyond the second movement end when the fluctuation in angle of view by movement of the focusing optical portion is corrected with the zoom optical portion movement.

Other objects of the present invention will become apparent from the following description of some embodiments of the invention taken in conjunction with the accompanying drawings.

DESCRIPTION OF THE PREFERRED EMBODIMENTS

Figure 1:
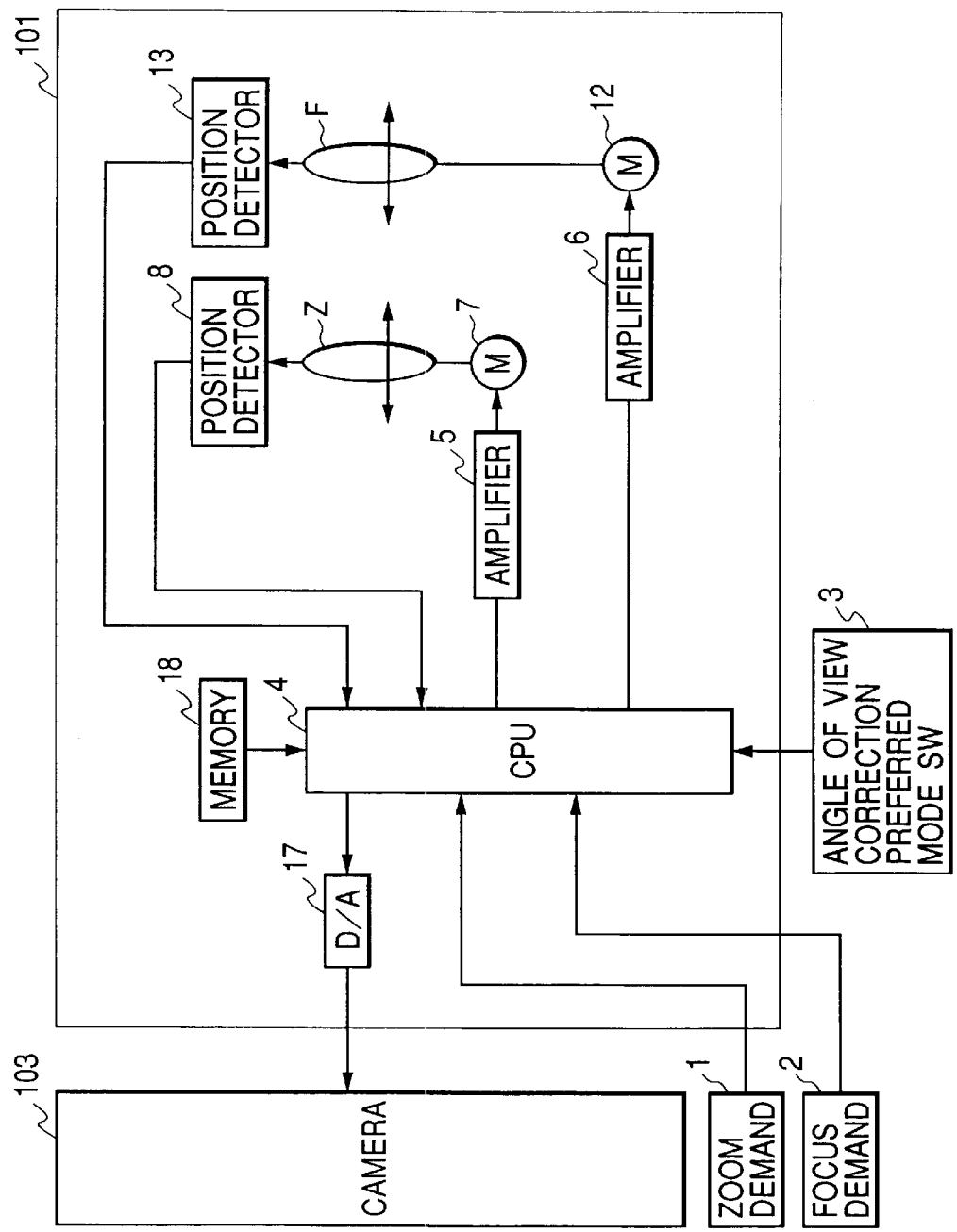
FIG. 1 shows the construction of a zoom lens apparatus which is an embodiment of the present invention.

FIG. 1 shows the construction of a zoom lens 101 which is an embodiment of the present invention. The reference numeral 4 designates a CPU (control means), and zoom demand 1 and focus demand 2 are connected to this CPU 4. From the zoom demand 1, zoom speed data (zoom operation information) corresponding to the operation speed thereof and zoom tracking limit data for limiting a driving tolerance for the zooming of a zoom portion Z are inputted to the CPU 4. From the focus demand 2, focus control data (focus operation information) corresponding to the operated amount thereof is also inputted to the CPU 4. Also, an angle of view correction preferred mode setting switch 3 is connected to the CPU 4. When this angle of view correction preferred mode setting switch 3 is ON, the angle of view fluctuation correcting function is preferred than the tracking function (a first mode), and when this switch 3 is OFF, the tracking function is preferred than the angle of view fluctuation correcting function (a second mode).

One of the outputs of the CPU 4 is connected through an amplifier 5 to a motor 7 for driving a lens constituting the zoom portion Z. The zoom portion Z is provided with a position detector 8 for detecting the absolute position of the lens. The position detector 8 is connected to the CPU 4.

Another output of the CPU 4 is connected through an amplifier 6 to a motor 12 for driving a lens constituting a focus portion F. The focus portion F is provided with a position detector 13 for detecting the absolute position of the lens. The position detector 13 is connected to the CPU 4.

Also, another output of the CPU 4 is connected through a D/A converter 17 to a TV camera 103. Thereby, follow signals indicative of the various states of the zoom lens 101, such as zoom follow data indicative of the lens position of the zoom portion Z, and iris follow data indicative of the aperture value of an aperture device (not shown) are communicated to the camera 103.

Also, a non-volatile memory 18 storing therein data for angle of view correction calculation is connected to the CPU 4. Here, the data for angle of view correction calculation will be briefly described.

In advance, the driving range of the lens of the zoom portion Z is divided into any number n and the driving range of the lens of the focus portion F is likewise divided into any number m, and the output data of counters for measuring output pulses in the position detectors 8 and 13 are calculated. Also, the angles of view at the ith division point of zoom and at the jth division point of focus are found by optical calculation and likewise, the angles of view at the ith division point of zoom and the (j+1)th division point of focus, the (i+1)th division point of zoom and the jth division point of focus, and the (i+1)th division point of zoom and the (j+1)th division point of focus are found by optical calculation, and the relation among the lens position of the zoom portion Z (hereinafter referred to as the zoom position), and the lens position of the focus portion F (hereinafter referred to as the focus position) in an area surrounded by these four points and the angles of view is approximated by the equation of a plane containing three of the four points. By applying the equation of this approximate plane, the angle of view can be indicated by a function (1) expression having the zoom position and the focus position as variables.

$$\omega = C_z \times P_z + C_f \times P_f + D \tag{1}$$

where $\omega$ represents the magnitude of the angle of view, $C_z$ represents the coefficient of the approximate plane relative to the zoom position, $P_z$ represents the zoom position, $C_f$ represents the coefficient of the approximate plane relative to the focus position, $P_f$ represents the focus position, and $D$ represents the constant term of the approximate plane.

The coefficients $C_z$, $C_f$ and $D$ of the equation of the approximate plane in which the relation among the zoom position, the focus position and the angle of view has been found in this manner are mapped and stored in the memory 18.

Figure 2B:
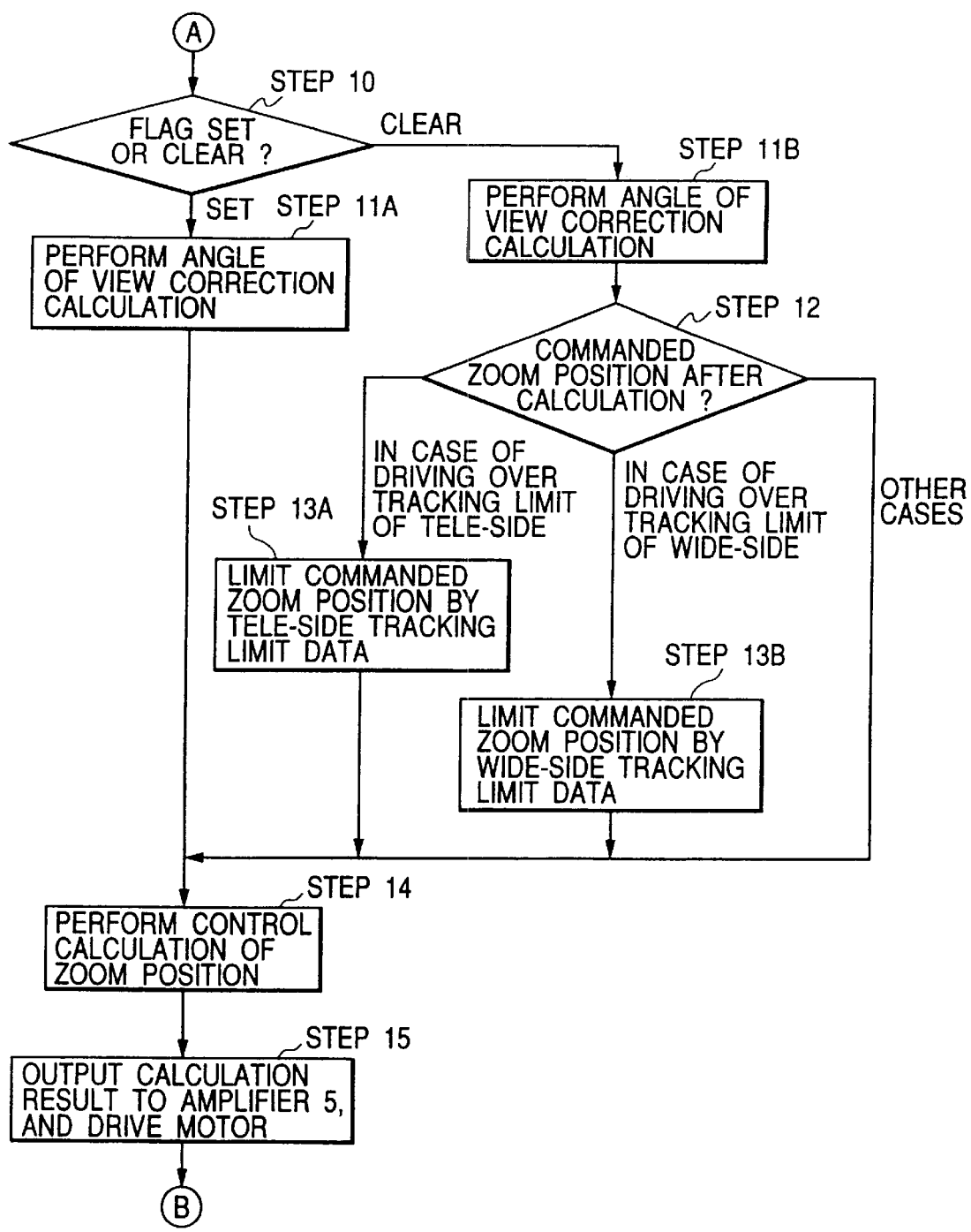
FIG. 2 is comprised of FIG. 2A and FIG. 2B showing flow charts of the operation of the zoom lens apparatus of FIG. 1.

The flow charts of FIGS. 2A and 2B show a series of operations in the above-described zoom lens. The CPU 4 proceeds to a step 1 immediately after the closing of a power source switch, and initializes the interior of the CPU 4. Also, it effects the initialization of the lens constituting the zoom portion Z by the use of the outputs from the position detector 8, and effects the initialization of the lens constituting the focus portion F by the use of the outputs from the position detector 13.

Next, at a step 2, the initialization of the communication with the zoom demand 1 and the focus demand 2 is effected. Here the initializing operation is terminated, and shift is made to the ordinary operation of controlling the zoom portion Z and the focus portion F in conformity with the outputs from the zoom demand 1 and the focus demand 2.

First, at a step 3, normalized zoom speed data Zspeed is inputted from the zoom demand 1, and further at a step 4, normalized focus control data Fdata is inputted from the focus demand 2.

Next, at a step 5, zoom tracking limit data is inputted from the zoom demand 1, and at a step 6, the zoom speed data inputted from the zoom demand 1 is integrated by the use of expression (2), and normalized zoom position data Zdata is calculated.

$$Zdata = Zbuf + K \times Zspeed \tag{2}$$

where Zbuf: the zoom position data during the previous sampling, k: any integration constant.

Also, at a step 7, the output from the angle of view correction preferred mode switch 3 is introduced, and at a step 8, the state of the angle of view correction preferred mode switch 3 is judged. If the angle of view correction preferred mode switch 3 is ON, an angle of view correction preferred flag is set at a step 9A, and advance is made to a step 10. If on the other hand, at the step 8, the angle of view correction preferred mode switch 3 is OFF, the angle of view correction preferred flag is cleared at a step 9B, and advance is made to a step 10.

At the step 10, the angle of view correction preferred flag is judged. If the angle of view correction preferred flag is set, a mode in which the angle of view fluctuation correcting function is preferred than the tracking function is entered.

In this angle of view correction preferred mode, at a step 11A, angle of view correction calculation is performed by the use of the zoom position data Zdata and focus control data Fdata inputted from the focus demand 2, and a zoom position command is calculated.

Here, the angle of view correction calculation will be briefly described. First, by the use of expression (3), the normalized focus position data Fdata is converted into a focus position command Focus corresponding to the output of the counter in the position detector 13.

$$Focus = Far + Fdata/NOM \times (Near - Far) \quad (3)$$

where Far: infinite end focus command,

Near: Near end focus position command,

NOM: maximum value of normalized focus position data.

Next, the coefficient of the equation of an approximate plane corresponding to an area including the values of the counters in the position detectors 8 and 13 is inputted from the memory 18. The inputted coefficient is substituted for Cz, Cf and D of expression (1), the value of the counter in the position detector 8 is substituted for Pz, and the value of the counter in the position detector 13 is substituted for Pf, whereby a standard angle of view ωorg is calculated.

Next, the coefficient of the equation of an approximate plane corresponding to an area including the value of the counter in the position detector 8 and the focus position command Focus is inputted from the memory 18. The inputted coefficients Cz', Cf', D', the standard angle of view ωorg and the focus position command Focus are substituted for expression (4), whereby a zoom position command Zoom corresponding to the output of the counter in the position detector 8 is calculated.

$$Zoom = (\omega org - Cf' \times Focus - D')/Cz' \quad (4)$$

After angle of view correction calculation has been thus performed, advance is made to a step 14, where the position control calculation of zoom is performed by the use of the zoom position command Zoom after the correction calculation and the value of the counter in the position detector 8, and advance is made to a step 15, where the result of the calculation at the step 14 is outputted to the amplifier 5, and the motor 7 is driven.

Thereby, for example, even when the zoom position command for angle of view fluctuation correction exceeds the tracking limit data, the zoom portion Z is driven without the zoom position command being limited by the tracking limit data until the zoom position arrives at a position corresponding to the zoom position command for angle of view fluctuation correction, whereby the angle of view is kept constant. Accordingly, the angle of view correcting function can be prevented from not working at a tracking limit point and the angle of view can be prevented from being suddenly fluctuated.

On the other hand, if at the step 10, the angle of view correction preferred flag is cleared, a mode in which the tracking function is preferred than the angle of view fluctuation correcting function is entered.

In this tracking limit preferred mode, at a step 11B, angle of view correction calculation is performed by the use of the zoom position data Zdata and the focus control data Fdata inputted from the focus demand 2, and the zoom position command is calculated. The angle of view correction calculation here is the same as the angle of view correction calculation at the step 11A.

Next, at a step 12, whether the zoom position command after the correction calculation exceeds the tele-side limit data of the tracking limit data and is further on the tele-side, or exceeds the wide-side limit data and is further on the wide-side or within the range of the tele-side limit data and the wide-side limit data is judged.

If the zoom position command exceeds the tele-side tracking limit data, advance is made to a step 13A, where the zoom position command is limited by the tele-side tracking limit data, and advance is made to a step 14. If the zoom position command exceeds the wide-side tracking limit data, advance is made to a step 13B, where the zoom position command is limited by the wide-side tracking limit data, and advance is made to a step 14. If the zoom position command is within the range of the tele-side limit data and the wide-side limit data, advance is intactly made to a step 14.

The position control calculation of zoom is performed by the use of the zoom position command limited at the steps 13A and 13B or the zoom position command intactly regarded as being effective because it is within the range of the tele-side limit data and the wide side limit data and the value of the counter in the position detector 8, and advance is made to a step 15, where the result of the calculation at the step 14 is outputted to the amplifier 5, and the motor 7 is driven.

As described above, in the tracking preferred mode, for example, when the zoom position command for angle of view fluctuation correction exceeds the tracking limit data, the zoom position command is limited by the tracking limit data, and the zoom driving range for angle of view fluctuation correction is limited to within the range of the tracking limit. Therefore, for example, when it is desired to keep the quantity of photographing light constant, the reduction in the quantity of photographing light by the zoom portion Z exceeding the range of the tracking limit for angle of view fluctuation correction on the tele-side and being further driven to the tele-side can be prevented.

The steps 3 to 15 are repetitively executed until the power source is cut off after the driving of the motor at the step 15.

While in the above-described embodiment, description has been made of a case where whether the zoom position command exceeds the tracking limit data, i.e., the allowable end of the driving of the zoom portion is judged and the angle of view fluctuation correction control of the zoom portion is effected, the present invention can also be applied to a case where whether the zoom position demand is outside a predetermined driving command is discriminated and the angle of view fluctuation correction control of the zoom portion is effected.

Also, both of the tele-side tracking limit data and the wide-side tracking limit data in the above-described embodiment may be set to the intermediate position between the tele-end and the wide-end, or one of them may be set to the tele-end or the wide-end.

While the above embodiment has been described with respect to a zoom lens mounted on a TV camera, the present invention is also applicable to zoom lenses mounted on various cameras such as a silver salt camera and a video camera.

Figure 3:
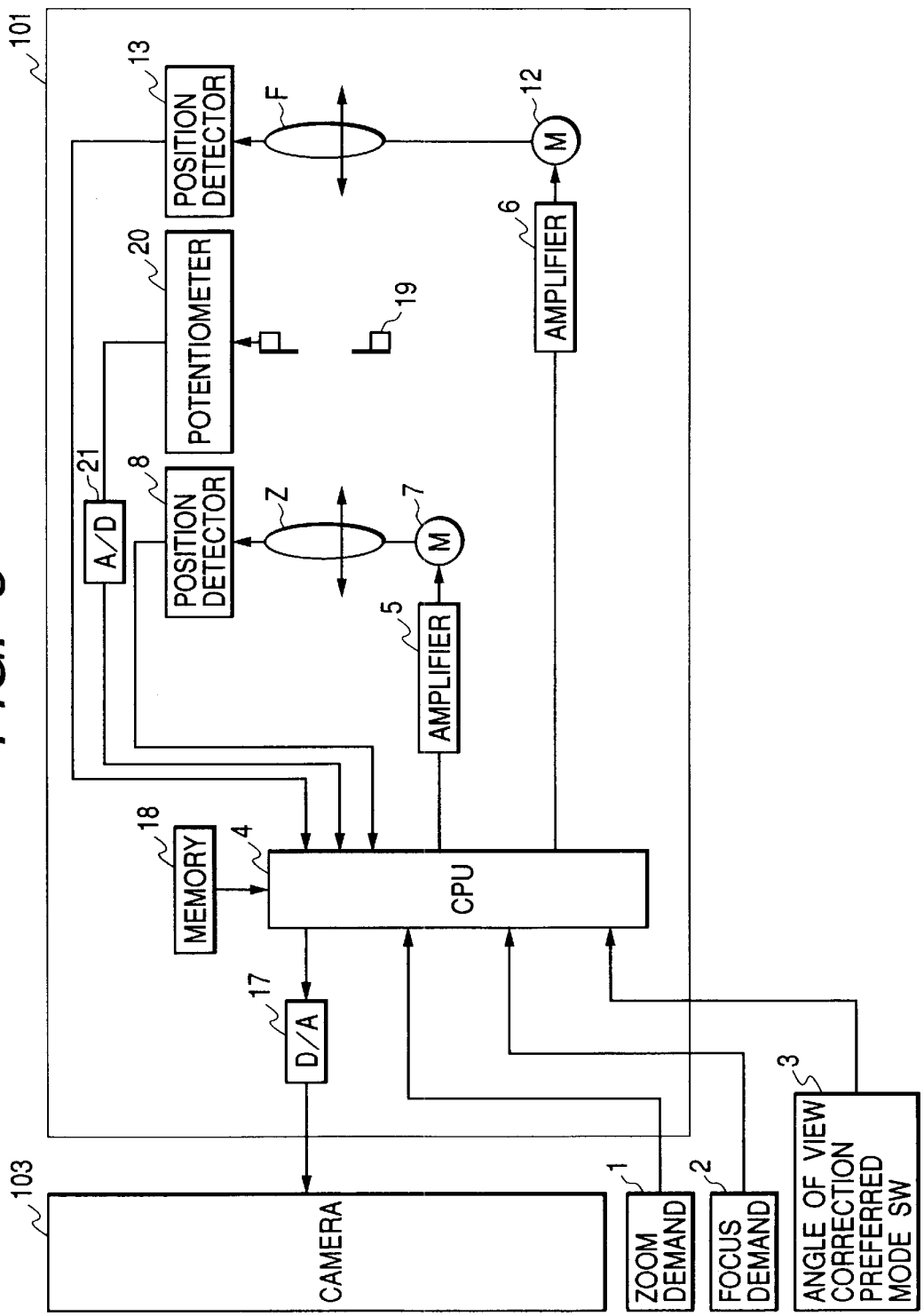
FIG. 3 shows the construction of a zoom lens apparatus which is another embodiment of the present invention.

FIG. 3 shows the construction of a zoom lens apparatus 101 which is another embodiment of the present invention. The reference numeral 4 designates a CPU (control means), and zoom demand 1 and focus demand 2 are connected to this CPU 4. From the zoom demand 1, zoom speed data (zoom operation information) corresponding to the operating speed thereof is inputted to the CPU 4. Also, from the focus demand 2, focus control data (focus operation information) corresponding to the amount of operation thereof is inputted. Also, an angle of view correction preferred mode setting switch 3 is connected to the CPU 4. When this angle of view correction preferred mode setting switch 3 is ON, the angle of view fluctuation correcting function is preferred than the F value preferred function (a first mode, an angle of view holding mode), and when this switch 3 is OFF, the F value preferred function is preferred than the angle of view fluctuation correcting function (a second mode).

One of the outputs of the CPU 4 is connected through an amplifier 5 to a motor 7 for driving a lens constituting a zoom portion Z. The zoom portion Z is provided with a position detector 8 for detecting the absolute position of the lens. An internal counter in this position detector 8 is connected to the CPU 4.

Another output of the CPU 4 is connected through an amplifier 6 to a motor 12 for driving a lens constituting a focus portion F. The focus portion F is provided with a position detector 13 for detecting the absolute position of the lens. An internal counter in this position detector 13 is connected to the CPU 4.

Further, the reference numeral 19 denotes an aperture (quantity of light setting means) for setting (or adjusting) the quantity of light passing through an optical system including the zoom portion Z and the focus portion F. This aperture 19 has a light intercepting member for variably setting the passage area of the light, and the position of this light intercepting member (i.e., an aperture value corresponding to the passage area of the light) is detected by a potentiometer 20. The potentiometer 20 is connected to the CPU 4 through an A/D converter 21.

Also, another output of the CPU 4 is connected to a TV camera 103 through a D/A converter 17. Thereby, follow signals indicative of the various states of the zoom lens apparatus 101, such as zoom follow data indicative of the lens position of the zoom portion Z, and iris follow data indicative of the aperture value of the aperture 19.

Also, a non-volatile memory 18 storing therein data for angle of view correction calculation and F value limit data corresponding to iris data to be described hereinafter and indicative of the tele-side driving allowable position of the zoom portion Z at which the quantity of light passing through the optical system is not reduced below the set value by the aperture 19 is connected to the CPU 4.

Figure 4B:
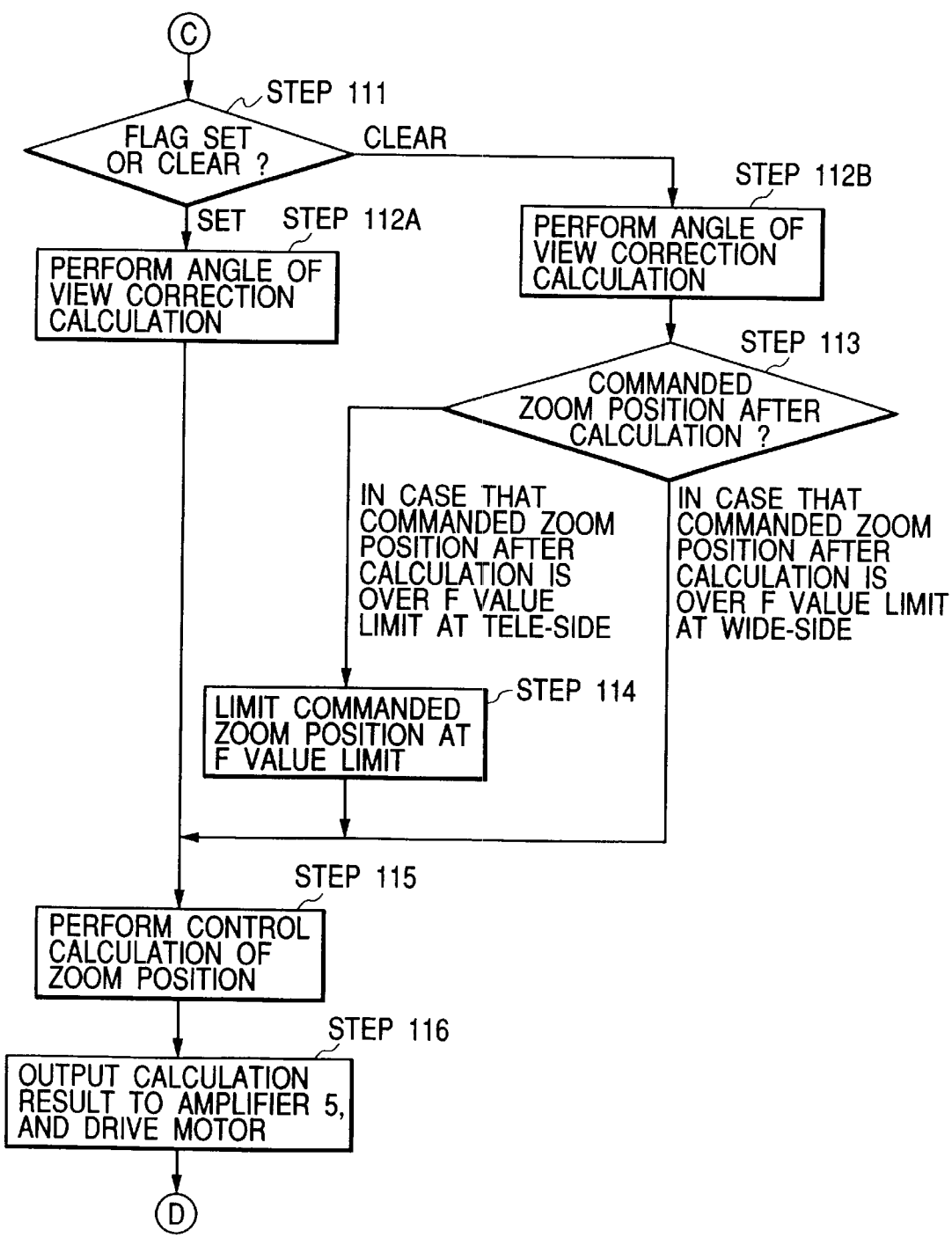
FIG. 4 is comprised of FIG. 4A and FIG. 4B showing flow charts of the operation of the zoom lens apparatus of FIG. 3.

The flow charts of FIGS. 4A and 4B show a series of operations in the above-described zoom lens apparatus. The CPU 4 proceeds to a step 101 immediately after the closing of a power source switch, and initializes the interior of the CPU 4. Also, it effects the initialization of the lens constituting the zoom portion Z by the use of the counter output from the position detector 8, and effects the initialization of the lens constituting the focus portion F by the use of the counter output from the position detector 13.

Next, at a step 102, the initialization of the communication with the zoom demand 1 and the focus demand 2 is effected. Here, the initializing operation is terminated, and shift is made to the ordinary operation of controlling the zoom portion Z and the focus portion F in conformity with the outputs from the zoom demand 1 and the focus demand 2.

First, at a step 103, normalized zoom speed data Zspeed is inputted from the zoom demand 1, and further at a step 104, normalized focus control data Fdata is inputted from the focus demand 2.

Next, at a step 105, the voltage of the potentiometer 20 is inputted as iris data through the A/D converter 21.

Next, at a step 106, the zoom speed data inputted from the zoom demand 1 is integrated by the use of expression (2), and normalized zoom position data Zdata is calculated.

$$Zdata = Zbuf + K \times Zspeed \qquad (2)$$

where Zbuf: zoom position data during the previous sampling,

K: any integration constant.

Also, at a step 107, F value limit data corresponding to the iris data inputted at the step 105 is inputted from the memory 18.

Next, at a step 108, the output from the angle of view correction preferred switch 3 is introduced, and at a step 109, the state of the angle of view correction preferred switch 3 is judged. If the angle of view correction preferred switch 3 is ON, an angle of view correction preferred flag is set at a step 110A, and advance is made to a step 111. On the other hand, if at the step 109, the angle of view correction preferred switch 3 is OFF, the angle of view correction preferred flag is cleared at a step 110B, and advance is made to the step 111.

At the step 111, the angle of view correction flag is judged. If the angle of view correction flag is set, a mode in which the angle of view fluctuation correcting function is preferred than the F value preferred function is entered.

In this angle of view correction preferred mode, at a step 112A, angle of view correction calculation (this calculation is the same as that at the step 11A of FIGS. 2A and 2B) is performed by the use of the zoom position data Zdata and the focus control data Fdata inputted from the focus demand 2, and a zoom position command is calculated.

After angle of view correction calculation has been thus performed, advance is made to a step 115, where the position control calculation of zoom is performed by the use of the zoom position command Zoom after the correction calculation and the counter value of the position detector 8, and advance is made to a step 116, where the result of the calculation at the step 115 is outputted to the amplifier 5, and the motor 7 is driven.

Thereby, for example, even when the zoom position command for angle of view fluctuation correction exceeds the F value limit data and is on the tele-side, the zoom portion Z is driven until the zoom position arrives at a position corresponding to the zoom position command for angle of view fluctuation correction without the zoom position command being limited by the F value limit data, and the angle of view is kept constant. Accordingly, the angle of view correcting function can be prevented from not working at an F value limit point and the angle of view can be prevented from being suddenly fluctuated.

On the other hand, if at the step 111, the angle of view correction flag is cleared, a mode in which the F value preferred function is preferred than the angle of view fluctuation correcting function is entered.

In this F value limit preferred mode, at a step 112B, angle of view correction calculation is performed by the use of the zoom position data Zdata and the focus control data Fdata inputted from the focus demand 2, and the zoom position command is calculated. The angle of view correction calculation here is the same as the angle of view correction calculation at the step 112A.

Next, at a step 113, whether the zoom position command after the correction calculation exceeds the F value limit data and is on the tele-side or is more on the wide-side than the F value limit data is judged.

If the zoom position command exceeds the F value limit data and is on the tele-side, advance is made to a step 114, where the zoom position command is limited by the F value limit data, and advance is made to a step 115. If the zoom position command is more on the wide-side than the F value limit data, advance is intactly made to the step 115.

The position control calculation of zoom is performed by the use of the zoom position command limited at the step 114 or the zoom position command intactly regard as being effective because it is more on the wide-side than the F value limit data and the counter value of the position detector 8, and advance is made to a step 116, where the result of the calculation at the step 115 is outputted to the amplifier 5, and the motor 7 is driven.

As described above, in the F value limit preferred mode, when the zoom position command for angle of view fluctuation correction exceeds the F value limit data and is on the tele-side, the zoom position command is limited by the F value limit data, and the zoom driving range for angle of view fluctuation correction is limited to within the F value limit range (quantity of light maintaining range). Accordingly, when it is preferred to keep the quantity of photographing light rather than the angle of view constant, the reduction in the quantity of photographing light by the zoom portion Z being further driven to the tele-side beyond the F value limit position for the purpose of angle of view fluctuation correction can be prevented.

The steps 103 to 116 are repetitively executed until the power source is cut off after the driving of the motor at the step 116.

While in the above-described embodiment, description has been made of a case where whether the zoom position command exceeds the F value limit data, i.e., the quantity of light maintaining end of the zoom position, is judged and the angle of view fluctuation correction control of the zoom portion is effected, the present invention can also be applied to a case where whether the zoom position command is outside the quantity of light maintaining range is discriminated and the angle of view fluctuation correction control of the zoom portion is effected.

Also, while the above embodiment has-been described with respect to a zoom lens apparatus mounted on a TV camera, the present invention is also applicable to a zoom lens apparatus mounted on various cameras such as a silver salt camera and a video camera.

Figure 5:
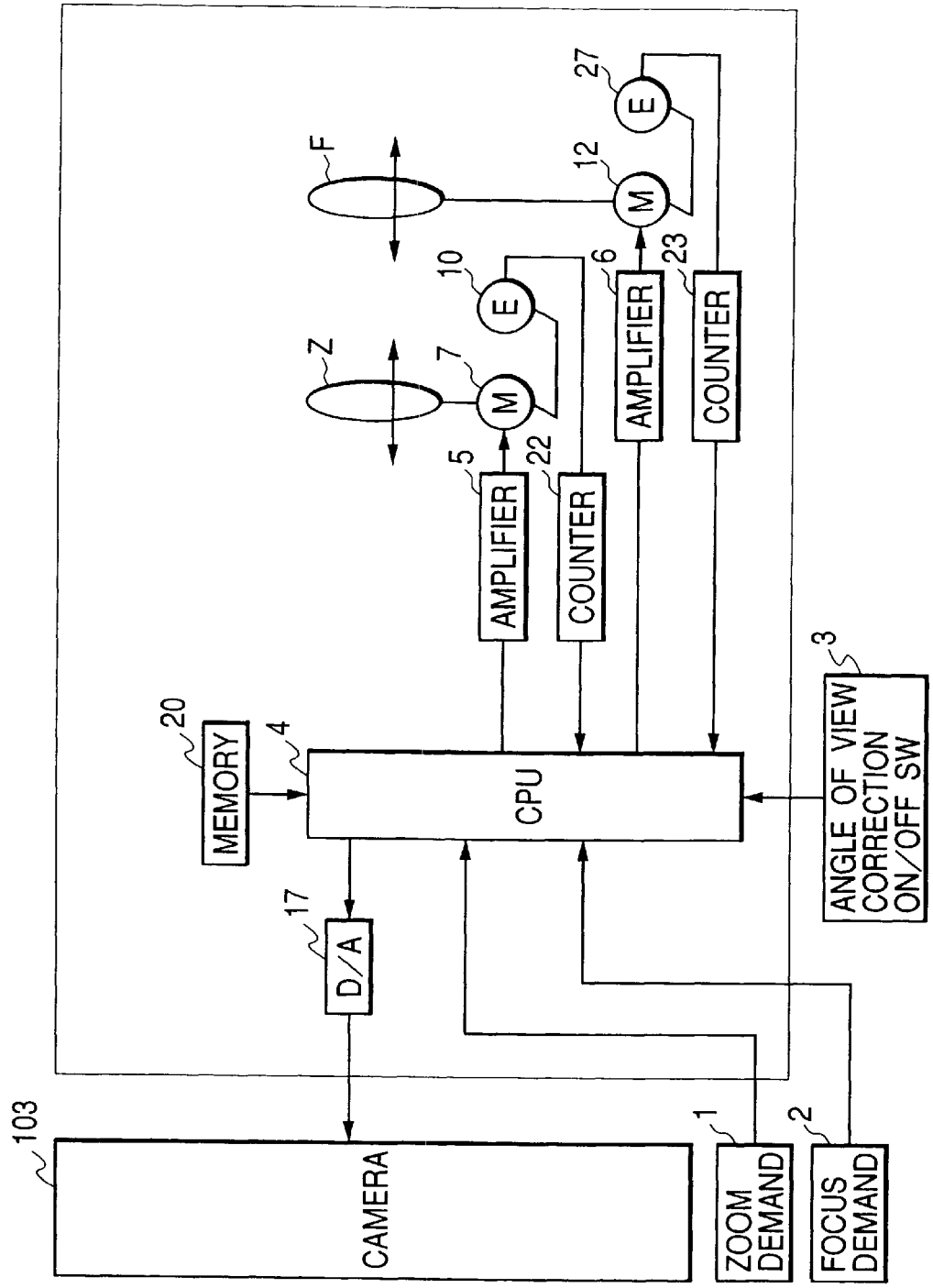
FIG. 5 shows the construction of a zoom lens apparatus which is another embodiment of the present invention.

FIG. 5 shows the construction of a zoom lens which is another embodiment of the present invention. Zoom demand 1 and focus demand 2 are connected to this zoom lens 101, and the zoom lens 101 is mounted on a TV camera 103 to thereby constitute a camera system.

The zoom demand 1 inputs normalized zoom speed data (a zoom control signal) to a CPU (control means, angle of view control means) 4 in response to a user's operation. Also, the focus demand 2 inputs normalized focus position data to the CPU 4 in response to the user's operation. Instead of the zoom demand 1 and the focus demand 2, zoom speed data or zoom position data and focus position data may be inputted from the control unit (not shown) of the TV camera 103 to the CPU 4.

The reference numeral 3 designates an angle of view correction ON/OFF switch for changing over the ON/OFF of the angle of view correcting function, and this switch 3 is connected to the CPU 4.

One output of the CPU 4 is connected through an amplifier 5 to a zooming motor 7 for driving a zoom portion Z. A rotary encoder 10 for outputting the position of a lens constituting the zoom portion Z (hereinafter referred to as the zoom position) is connected to the zoom portion Z, and the output of this rotary encoder 10 is connected to the CPU 4 through a counter 22.

The other output of the CPU 4 is connected through an amplifier 6 to a focusing motor 12 for driving a focus portion F. A rotary encoder 27 for outputting the position of a lens constituting the focus portion F (hereinafter referred to as the focus) is connected to the focus portion F, and the output of this rotary encoder 27 is connected to the CPU 4 through a counter 23.

The reference numeral 20 designates a memory storing therein the coefficients of an approximate plane equation used for angle of view correction calculation, the maximum angle of view and minimum angle of view obtained by the present zoom lens and wide-end which is the driving end of the zoom portion Z by servo and tele-end limit data, and the memory 20 is connected to the CPU 4.

Figure 9:
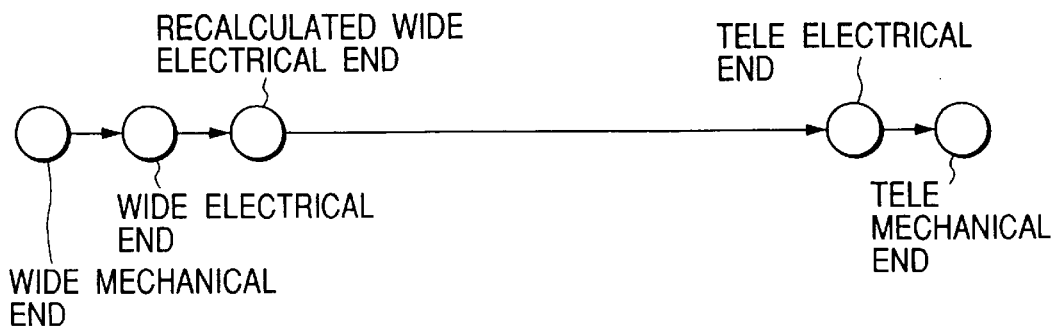
FIG. 9 shows the relations among a zoom portion, a mechanical end and an electrical end in the zoom lens apparatus of FIG. 5.
Figure 10:
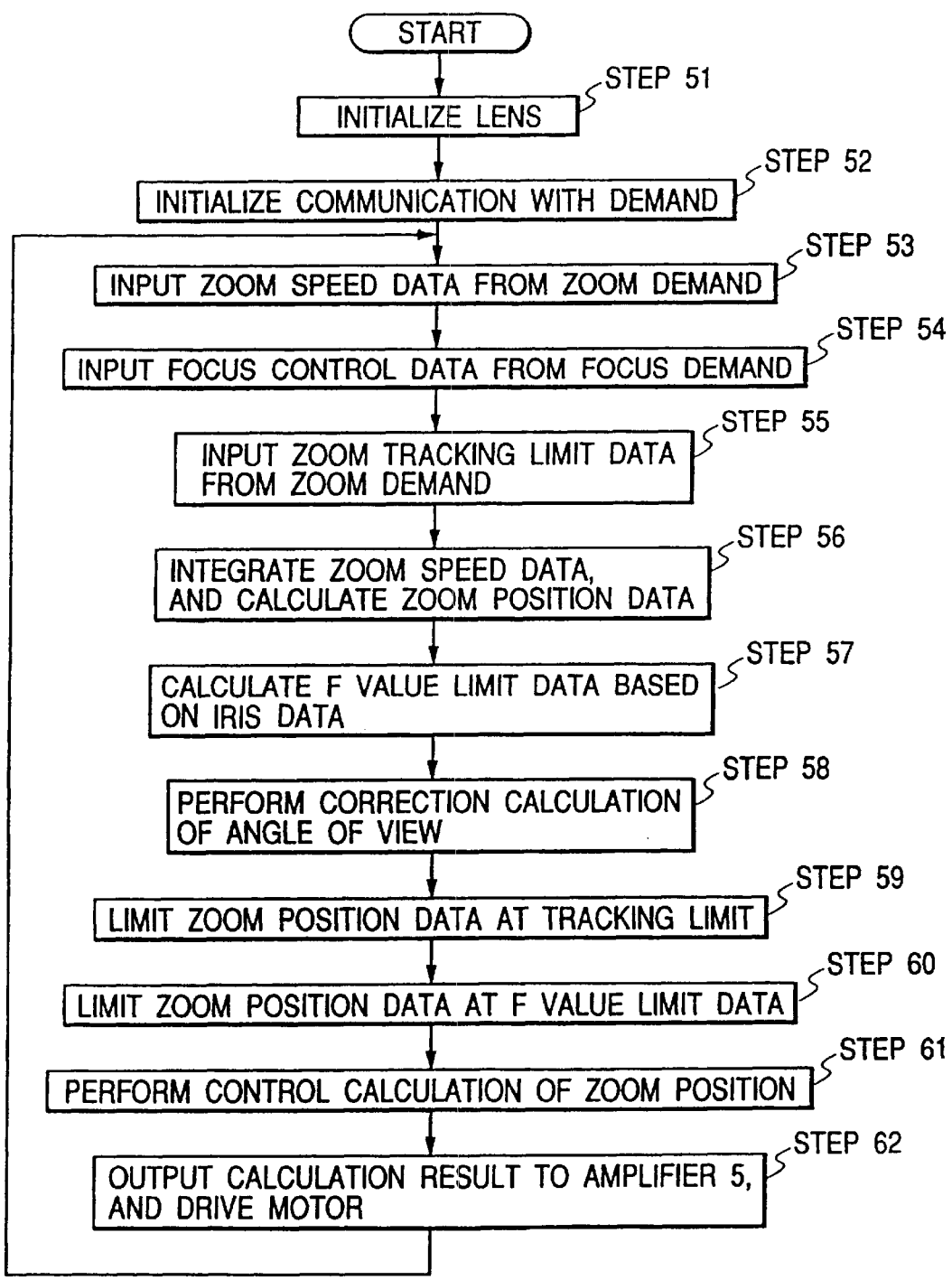
FIG. 10 is a flow chart of the control of a zoom lens apparatus according to the prior art.

Here, in the present zoom lens, it is necessary to prevent the zoom portion Z and the driving potion therefore from colliding with a driving end in the mechanism (hereinafter referred to as the mechanical end) to thereby adversely affect the optical performance of the lens or damage a driving system such as a motor because the lens of great weight is moved at high speed. Therefore, as shown in FIG. 9, the wide-end limit position (hereinafter referred to as the wide-side electrical end) as the driving end by servo (predetermined driving end) is set more adjacent to the tele-side than the wide-side mechanical end. The also holds true of the tele-side of the zoom portion Z and the infinity side and near side of the focus portion F.

The CPU 4 is connected to the TV camera 103 through a D/A converter 17, and communicates various kinds of information of the zoom lens 101 side to the camera 103. Likewise, the communication of information from the camera 103 side to the lens 101 side is possible.

Figure 6B:
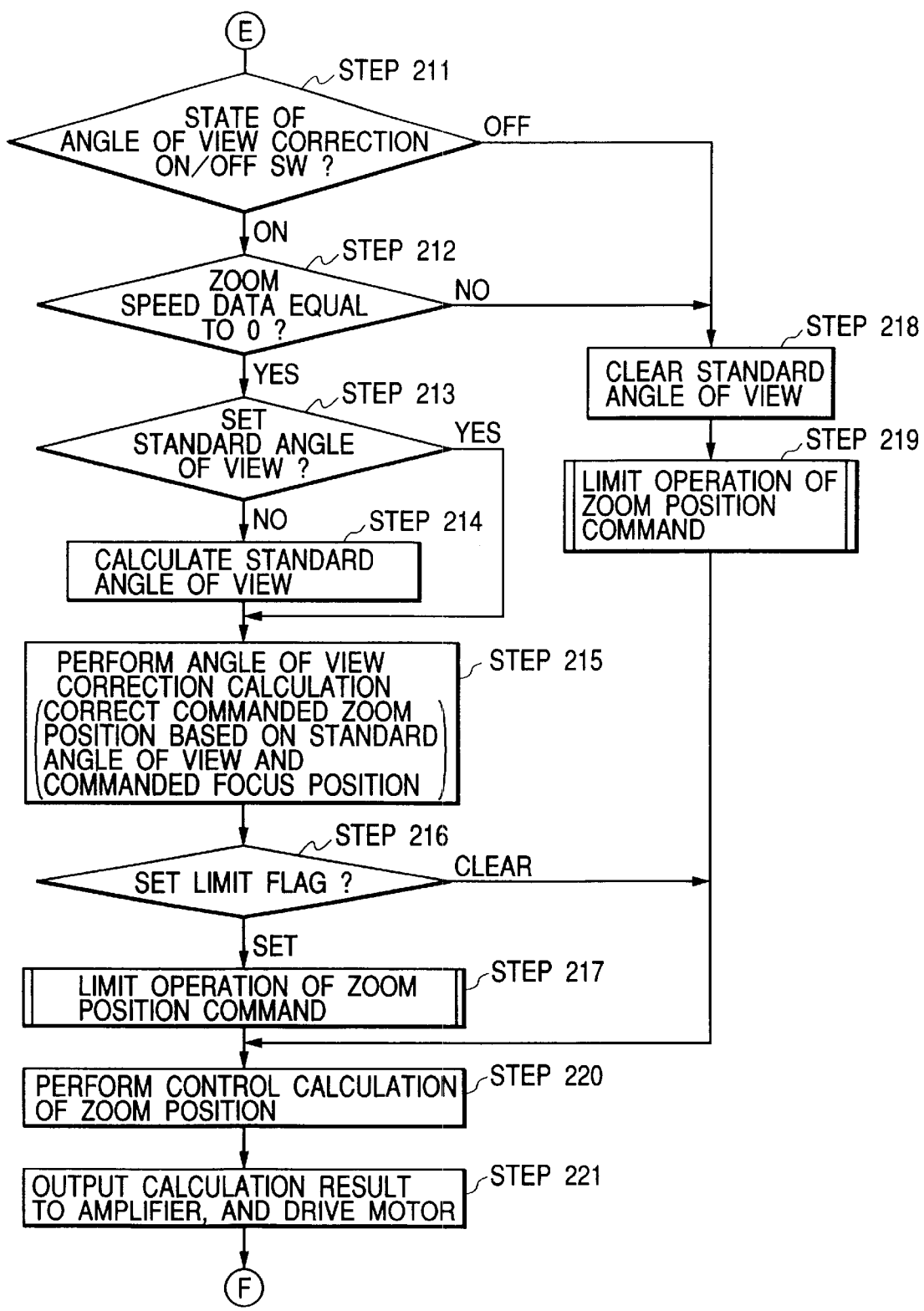
FIG. 6 is comprised of FIG. 6A and FIG. 6B showing flow charts of the control of the zoom lens apparatus of FIG. 5.

Reference is now made to the flow charts of FIGS. 6A and 6B to describe a series of operations from immediately after the closing of a power source switch until the motor is driven in the zoom lens of the present embodiment.

The CPU 4 initializes the interior of the CPU 4 immediately after the closing of the power source switch, and proceeds to a step 201. At the step 201, the initialization of the zoom portion Z and the focus portion F is effected, and at a step 202, the communication with the zoom demand 1 and the focus demand 2 is initialized. Further at a step 203, the maximum angle of view $\omega_{max}$ obtained in the present zoom lens is read from the memory 20. This maximum angle of view $\omega_{max}$ is indicative of the maximum value of the angle of view obtained with the zoom portion Z driven from the wide side electrical end to the tele-side electrical end and the focus portion F driven from the infinity side electrical end to the near side electrical end.

At a step 204, the initial value of wide-end limit data (hereinafter referred to as the wide-side electrical end data)

indicative of the wide-side electrical end which is the driving end of the zoom portion Z by servo is read from the memory 20. This terminates a series of initializing operations, whereafter shift is made to the ordinary operation of controlling the zoom portion Z and the focus portion F in conformity with control data outputted from the zoom demand 1 and the focus demand 2.

In the ordinary operation, at a step 205, normalized zoom speed data is first inputted from the zoom demand 1, and this data is integrated and normalized zoom position data is calculated. Next, at a step 206, normalized focus position data is inputted from the focus demand 2.

At a step 207, the normalized zoom position data obtained at the step 204 is converted into a zoom position command which is the intrinsic data of the present zoom lens indicative of the position of the zoom portion Z. Also, at a step 208, as on the zoom side, the normalized focus position data inputted from the focus demand 2 is converted into a focus position command which is the intrinsic data of the lens indicative of the position of the focus portion F.

Next, at a step 209, the values of the counter 22 and counter 23 (hereinafter the value of the counter 22 will be referred to as zoom follow and the value of the counter 23 will be referred to as focus follow) indicative of the positions of the lens constituting the current zoom portion Z and the lens constituting the focus portion F (referred to as the zoom position and the focus position, respectively) are inputted.

Next, at a step 210, the electrical end data of the zoom portion Z is calculated by the use of the focus follow, etc.

Figure 7:
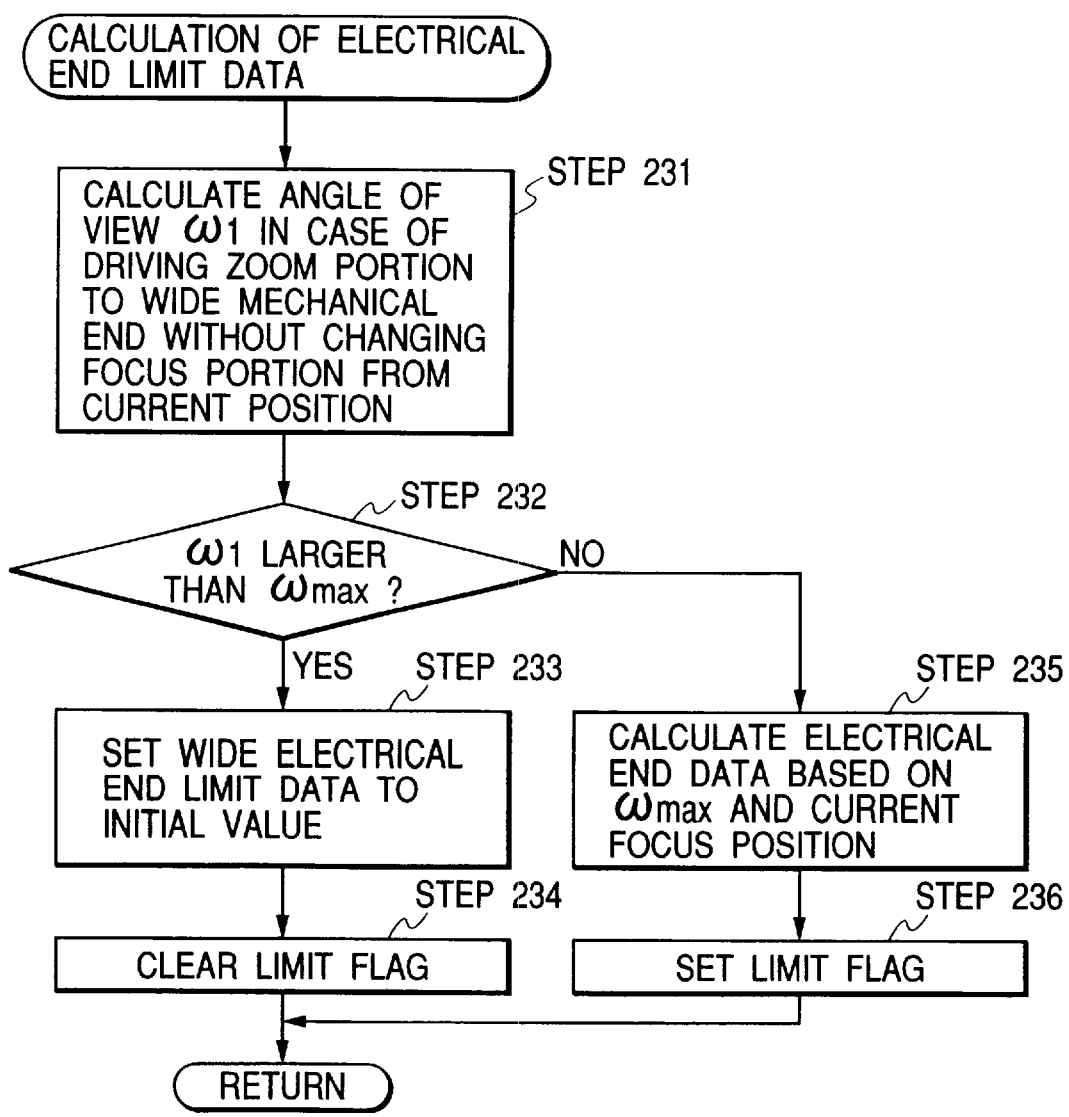
FIG. 7 is a flow chart of an electrical end data calculating process in the zoom lens apparatus of FIG. 5.

FIG. 7 shows the calculation processing operation of the electrical end limit data at the step 210. Here, the calculating process of the electrical end limit data will be described with the wide-end side of the zoom portion Z as an example.

At the step 231 of FIG. 7, the angle of view (calculation angle of view) $\omega_1$, when the focus portion F is at the current position and the zoom portion Z is driven to the wide-side mechanical end is calculated. Subsequently, at a step 232, the angle $\omega_1$, and the maximum angle of view $\omega_{max}$ inputted from the memory 20 are compared with each other. When the angle of view $\omega_1$ is equal to or greater than the maximum angle of view $\omega_{max}$, that is, when the driving for the angle of view fluctuation correction of the zoom portion Z can be effected and the angle of view can be kept constant even if the focus demand 2 is operated in the entire range, in case that the zoom portion Z is positioned at the electrical end by widening the driving range of the zoom portion Z to the mechanical end, advance is made to a step 233, where the initial value inputted as the wide-side electrical end data from the memory 20, i.e., data indicative of the wide-side electrical end preset to avoid the driving to the mechanical end, is set. At a step 234, a limit flag is cleared so that the zoom position command after the angle of view correction calculation may not be limited at the wide-side electrical end.

On the other hand, if at the step 232, the angle of view $\omega_1$ is smaller than the maximum angle of view $\omega_{max}$, that is, if the amount of driving of the zoom portion Z for angle of view fluctuation correction is deficient and the angle of view cannot be kept constant even if the zoom portion Z is driven to the mechanical end, in case that the focus demand 2 is operated when the zoom portion Z is positioned at the wide-side electrical end, advance is made to a step 235.

At the step 235, the wide-side electrical end data of the zoom portion Z is calculated by the use of the maximum angle of view $\omega_{max}$ and the focus follow. The wide-side electrical end data obtained at this time, as shown in FIG. 9, becomes a value indicative of the tele-side position (the position before the wide-side electrical end is arrived at) rather than the initial value inputted from the memory 20 in order to secure the driving range of the zoom portion Z necessary for the angle of view fluctuation correction. At a step 236, a limit flag is set to limit the zoom position command after the angle of view correction calculation at the wide-side electrical end, and return is made to the step 211 of FIGS. 6A and 6B. Similar calculation and ON/OFF of the limit flag are also performed on the tele-side.

At a step 211, the state of the angle of view correction ON/OFF switch 3 is judged. When the angle of view correction ON/OFF switch 3 is set to ON, advance is made to a step 212, where the zoom speed data inputted from the zoom demand 1 is judged. When the zoom speed data is 0, that is, when the zoom demand 1 is not operated, advance is made to a step 213, where whether a standard angle of view $\omega$org to be maintained constant is set is confirmed. When the standard angle of view $\omega$org is cleared, that is, when the angle of view correction ON/OFF switch 3 has been changed over from OFF to ON, or when the operation of the zoom demand 1 has ended, the zoom follow and the focus follow and calculation coefficients conforming to them are inputted from the memory 20, and the standard angle of view $\omega$org is calculated, and advance is made to a step 215.

If at the step 213, the standard angle of view $\omega$org is set, jump is intactly made to the step 215.

At the step 215, calculation for correcting the zoom position command converted at the step 207 to a zoom position command for maintaining the angle of view at the standard angle of view $\omega$org is performed by the use of the standard angle of view $\omega$org and the focus position command calculated at the step 208. Thereafter, at a step 216, the limit flag is judged, and if the limit flag is set, at a step 217, the zoom position command after the angle of view correction calculation is limited by the electrical end data obtained at the step 210, and advance is made to a step 220.

On the other hand, if at the step 216, the limit flag is cleared, the zoom position command after the angle of view correction calculation is not limited but jump is made to the step 220 in order to widen the driving range of the zoom portion Z for angle of view fluctuation correction to the mechanical end.

Also, if at the step 211, the angle of view correction ON/OFF switch 3 is set to OFF and if at the step 212, the zoom speed data is not 0 (the zoom demand 1 is operated), advance is made to a step 218, where the standard angle of view $\omega$org is cleared. Further, at a step 219, the zoom position command is limited by the electrical end data obtained at the step 210, and jump is made to the step 220.

Figure 8:
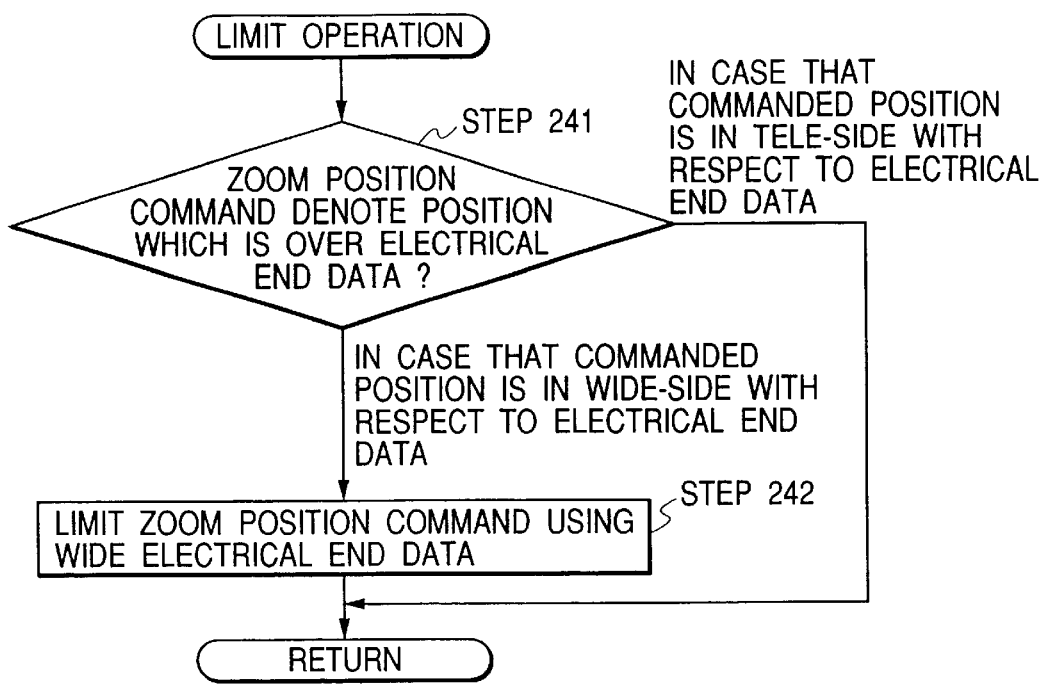
FIG. 8 is a flow chart of a zoom position command limit process in the zoom lens apparatus of FIG. 5.

FIG. 8 shows the limit processing operation for the zoom position command at the step 217 and the step 219. Here, the limit operation for the zoom position command will be described with the wide-end side of the zoom portion Z as an example.

First, at a step 241, whether the zoom position command corresponds to the wide-side with respect to the position indicated by the wide-side electrical end data is discriminated. If it corresponds to the wide-side, advance is made to a step 242, where the zoom position command is limited by the wide-side electrical end data, and if it corresponds to the tele-side, advance is intactly made to the step 220 of FIGS. 6A and 6B.

At the step 220, the position control calculation of the zoom portion Z is performed by the use of the zoom position command and the value of the counter 22 and the position control calculation of the focus portion F is performed by the use of the focus position command and the value of the counter 23. At a step 221, the results of the calculations at the step 220 are outputted to the amplifier 5 and the amplifier 6, respectively, and the motor 7 and the motor 12 are driven to thereby drive-control the zoom portion Z and the focus portion F. Thereafter, the steps 205 to 221 are repetitively executed until the power source is cut off.

As described above, in the present embodiment, in case that the driving range of the zoom portion Z is widened to the mechanical end, when the angle of view can be kept constant (the calculated angle of view $\omega_1$ is equal to or greater than the maximum angle of view $\omega_{max}$) even if the focus demand 2 is operated over the entire range when the zoom portion Z is positioned at the electrical end, the driving allowable end of the zoom portion Z which can be operated by the zoom demand 1 is set to the electrical end (steps 231 to 233) and the zoom position command after the angle of view correction calculation is not limited at the electrical end, but the driving range of the zoom portion Z for the angle of view fluctuation correction is widened to the mechanical end.

In other words, if the driving range of the zoom portion Z for the angle of view fluctuation correction is sufficient when the zoom portion Z is driven to the electrical end by the zoom speed data from the zoom demand 1, the driving to the mechanical end exceeding the electrical end is permitted only for the driving of the zoom portion Z for the angle of view fluctuation correction.

Thereby, the angle of view fluctuation correcting function can always be made to work effectively even if the focus portion F is driven over the entire driving range with the zoom portion Z driven to the electrical end.

The amount of driving of the zoom portion Z for the angle of view fluctuation correction is small (the driving speed is also small) and therefore, even if the zoom portion Z is driven to the mechanical end, the driving portion will not be damaged or the optical performance of the zoom portion Z will not be adversely affected.

On the other hand, in case that the focus demand 2 is operated over the entire range when the zoom portion Z is positioned at the electrical end, when the amount of driving of the zoom portion Z for the angle of view fluctuation correction is deficient and the angle of view cannot be kept constant (the angle of view $\omega_1$ is smaller than the maximum angle of view $\omega_{max}$) even if the zoom portion Z is driven to the mechanical end, the electrical end data corresponding to the position before the original electrical end is arrived at is calculated (at step 35), and the driving range of the zoom lens portion 7 which can be operated by the zoom demand I is narrowed to thereby secure a driving range necessary for the zoom portion Z to effect the angle of view fluctuation correction.

In other words, if the driving range of the zoom portion Z for the angle of view fluctuation correction becomes deficient when the zoom portion Z is driven to the electrical end by the zoom speed data from the zoom demand 1, the driving allowable end of the zoom portion Z by the operation of the zoom demand 1 is set to the position before the electrical end is arrived at so as to ensure the driving range. Thereby, irrespective of the driving position of the zoom portion Z by the zoom demand 1, when the focus portion F is driven over the entire driving range, the angle of view fluctuation correcting function can be made to work effectively.

While in the present embodiment, description has been made of a case where the driving allowable end of the zoom portion Z by the zoom demand 1 is variably set to the electrical end or the position before it is arrived at, the driving tolerance of the zoom portion by the zoom demand may be variably set to the range up to the electrical end or the range up to the position before the electrical end is arrived at.

What is claimed is:

1. A zoom lens apparatus which includes:
   a focusing optical portion;
   a zoom optical portion and in which a movement range of said zoom optical portion is regulated to a predetermined range; and,
   a control means which has a first mode for setting a movement of the zoom optical portion to within said regulated range, and a second mode for permitting a driving of said zoom optical portion beyond said regulated range when a fluctuation in the angle of view by the movement of said focusing optical portion is corrected.

2. A zoom lens apparatus according to claim 1, further comprising selecting means which selects said first and second modes.

3. A zoom lens apparatus according to claim 1, wherein in said second mode, said zoom optical portion is driven so as to maintain a standard angle of view.

4. A zoom lens apparatus according to claim 3, wherein in said first mode, said zoom optical portion is driven within said regulated range so as to maintain the standard angle of view.

5. A zoom lens apparatus according to claim 3, further comprising a calculating means which calculates zoom position information for maintaining said standard angle of view, on the basis of information of said standard angle of view and focusing position information.

6. A zoom lens apparatus according to claim 1, wherein the regulated range of said zoom optical portion is a range for which the actual quantity of passing light passing through said zoom optical portion which is varied by the movement of said zoom optical portion does not decrease below a predetermined quantity of light.

7. A camera system which includes a lens apparatus having a focus optical portion and a zoom optical portion, and a camera body to which said lens apparatus is connected, comprising:
   a regulating means which regulates a movement range of said zoom optical portion to a predetermined range; and
   a control means which has a first mode for setting a movement of the zoom optical portion to within said regulated range, and a second mode for permitting driving of said zoom optical portion beyond said regulated range when a fluctuation in the angle of view by the movement of said focusing optical portion is corrected.

8. A zoom lens apparatus which includes a focusing optical portion, a zoom lens optical portion and quantity of light varying means for variable setting a quantity of light passing through said optical portions, comprising:
   a regulating means which regulates a movement range of the zoom optical portion so that a variation in the quantity of passing light by the movement of the lens optical portion may not decrease below said set quantity of light; and
   a control means which has a first mode for driving the zoom optical portion within a movement range regulated by said regulating means, and a second mode for permitting a driving of said zoom optical portion beyond the movement range regulated by the regulating means when a fluctuation in the angle of view by the movement of said focusing optical portion is corrected.

9. A zoom lens apparatus according to claim 8, further comprising selecting means which selects said first and second modes.

10. A zoom lens apparatus according to claim 8, wherein in said second mode, the zoom optical portion is driven so as to maintain a standard angle of view.

11. A zoom lens apparatus according to claim 10, wherein in said first mode, the zoom optical portion is driven within said regulated range so as to maintain the standard angle of view.

12. A zoom lens apparatus according to claim 11, further comprising a calculating means which calculates zoom position information maintaining said standard angle of view, on the basis of information of said standard angle of view and focusing position information.

13. A zoom lens apparatus according to claim 8, wherein said regulated movement range is determined in conformity with the quantity of passing light set by said quantity of light varying means.

14. A zoom lens apparatus which includes a focusing optical portion and a zoom optical portion and in which movement range of said zoom optical portion is regulated to a predetermined range, comprising:
   a control means which has an angle of view maintaining mode for driving said zoom optical portion to correct the angle of view being fluctuated relative to a standard angle of view by focusing, and maintaining the angle of view at the standard angle of view, and a regulating function of regulating the zoom optical portion shifting more to a tele-side than a standard value to prevent any reduction in a quantity of light of a photographing optical system by a driving of said zoom optical portion; and
   a prohibiting means which prohibits control by said regulating function when said angle of view maintaining mode is selected.

15. A camera system which includes a lens apparatus having a focusing optical portion and a zoom optical portion, and a camera body to which said lens apparatus is connected, comprising:
   a control means which has a angle of view maintaining mode for driving the zoom optical portion to correct the angle of view being fluctuated relative to a standard angle of view by focusing, and maintaining the angle of view at the standard angle of view, and a regulating function of regulating the zoom optical portion shifting more to a tele-side than a standard value to prevent a reduction in a quantity of light of a photographing optical system by a driving of the zoom optical portion; and
   a prohibiting means which prohibits control by said regulating function when said angle of view maintaining mode is selected.

16. A camera system which includes a lens apparatus having a focusing optical portion and a zoom optical portion, and a camera body to which said lens apparatus is connected, comprising:
   quantity of light varying means which variably sets the quantity of light passing through said optical portions;
   a regulating means which regulates a movement range of said zoom optical portion so that a variation in a quantity of passing light by the movement of the zoom optical portion may not decrease below said set quantity of light; and
   a control means which has a first mode for driving the zoom optical portion within the movement range regulated by the regulating means, and a second mode for permitting a driving of the zoom optical portion beyond the movement range regulated by the regulating means when a fluctuation in the angle of view of the movement of said focusing optical portion is corrected.

17. A zoom lens apparatus which includes:
   a focusing optical portion;
   a zoom optical portion and in which a movement of said zoom optical portion is regulated up to a second movement end inside a first movement end portion in an area wherein said zoom optical portion is movable; and,
   a control means which permits said zoom optical portion to be driven toward a first movement end beyond said second movement end when a fluctuation in the angle of view by the movement of said focusing optical portion is corrected.

18. A zoom lens apparatus according to claim 17, wherein a maximum angle of view when said zoom optical portion is positioned at said second movement end and the angle of view when the zoom optical portion is moved from the second movement end toward the first movement end portion are compared with each other, and when the angle of view when the zoom optical portion is moved toward the first movement end is greater, said zoom optical portion is permitted to be driven toward the first movement end beyond said second movement end.

19. A zoom lens apparatus according to claim 18, wherein the maximum angle of view when said zoom optical portion is positioned at said second movement end and the angle of view when the zoom optical portion is moved from the second movement end toward the first movement end portion are compared with each other, and when the angle of view when the zoom optical portion is moved toward the first movement end is smaller, said second movement end is set further inside.

20. A zoom lens apparatus according to claim 17, further comprising a judging means which judges whether the correction of the angle of view is possible when the zoom optical portion is moved toward the first movement end portion from a state in which said zoom optical portion is positioned at said second movement end, and wherein when it is judged by said judging means that the correction of the angle of view is possible, said zoom optical portion is permitted to be driven toward the first movement end beyond said second movement end.

21. A zoom lens apparatus which includes:
   a focusing optical portion;
   a zoom optical portion and in which the movement range of said zoom optical portion is regulated to a predetermined range; and,
   a drive control means which drives said zoom optical portion beyond said predetermined range when the fluctuation in the angle of view by the movement of said focusing optical portion is corrected.

22. A lens apparatus comprising:
   a focusing portion; and,
   a zooming portion having a predetermined regulated range of movement, the regulated range being a range for which an actual quantity of passing light passing through said zooming portion is varied by a movement of said zooming portion does not decrease below a predetermined quantity of light.

* * * * *